Figure 1:
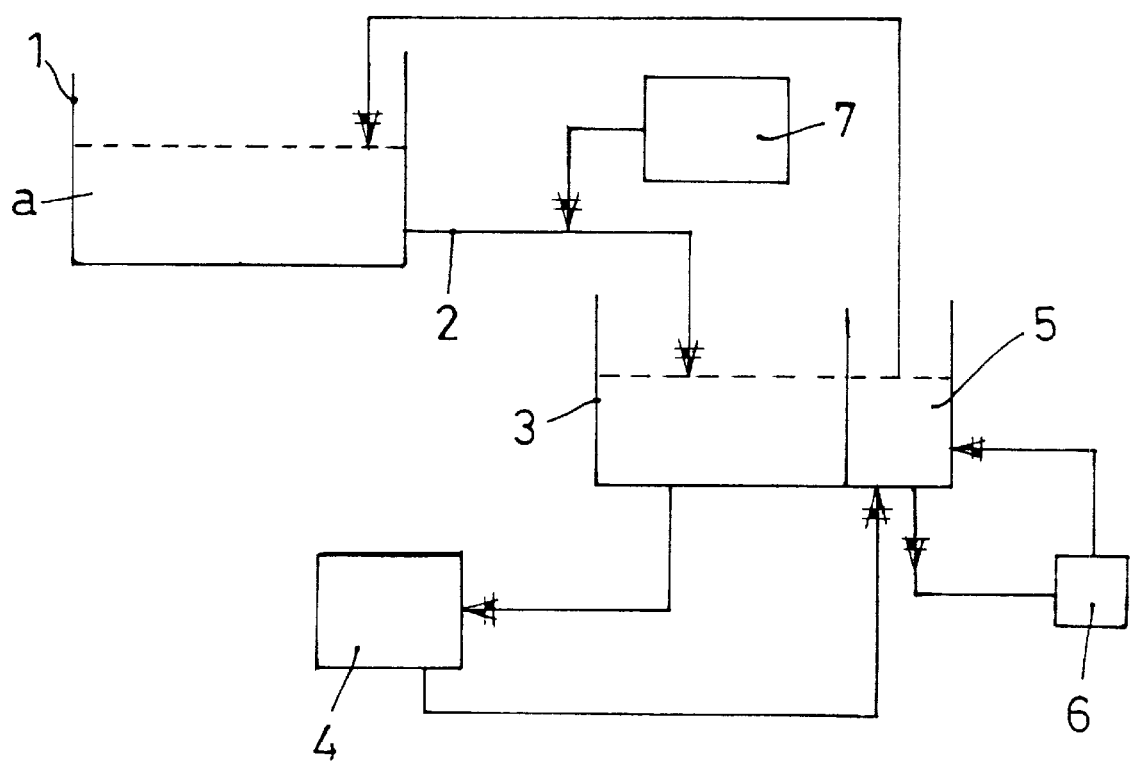

United States Patent [19]
Maidagan Larrumbide

[11] Patent Number: 5,993,663
[45] Date of Patent: Nov. 30, 1999

[54] LIQUID FILTERING SYSTEM IN MACHINE TOOLS

[75] Inventor: Javier Maidagan Larrumbide, Durango, Spain

[73] Assignee: Ona Electro-Erosion, S.A., Spain

[21] Appl. No.: 09/112,098

[22] Filed: Jul. 9, 1998

[51] Int. Cl.⁶ ........................................................ C02F 9/00
[52] U.S. Cl. .......................... 210/666; 210/686; 210/712; 210/734; 210/196; 210/200; 210/266
[58] Field of Search ................. 210/666, 686, 210/712, 734, 167, 196, 200, 266, 900, 669

[56] References Cited

U.S. PATENT DOCUMENTS

| | | | |
|---|---|---|---|
| 3,870,033 | 3/1975 | Faylor et al. | 210/900 |
| 3,883,426 | 5/1975 | Lewandowski et al. | 210/707 |
| 4,046,683 | 9/1977 | Tsunoda et al. | 210/728 |
| 4,336,129 | 6/1982 | Yoshimura et al. | 208/181 |
| 4,772,402 | 9/1988 | Love | 210/806 |
| 4,990,260 | 2/1991 | Pisani | 210/900 |

*Primary Examiner*—Ivars Cintins
*Attorney, Agent, or Firm*—Bierman, Muserlian and Lucas

[57] ABSTRACT

A liquid filtering system in machine tools which uses, in a recycling circuit, a work tank, a dirty liquid tank, a filter and a clean liquid tank in which water of a very low conductivity is used and adding at least one ferric oxide flocculent based on a polyelectrolyte polymer to the low conductivity water.

11 Claims, 1 Drawing Sheet

LIQUID FILTERING SYSTEM IN MACHINE TOOLS

In the machine tools where material is removed, the liquid used to cool and clean the work area, for example normal distribution network water, becomes contaminated by the shavings of the actual material being worked on.

A filtering system, in which the polluting agent is retained, is provided so that the liquid/water used is not consumed or wasted, for example in electroerosion jobs the spherical type shavings that are produced when the electrical current is applied on the part to be worked on are retained.

The polluting agent in the liquid/water, usually the shavings of the worked on material, partially dissolves without causing problems in the filtering system.

When the work methods recommend using low conductivity water, ($\gamma$): $\gamma \leq 20\ \mu S/cm$, it has been confirmed that the water becomes cloudy in the work/water filter area. This water is of a reddish color, which could mean the presence of a new polluting agent and which causes work problems, but it cannot be filtered or settled by conventional systems used in the machine tools.

The applicant has verified that the new polluting agent is ferric oxide of colloidal behavior and has solved the problem by adding a flocculent compound to the filtering circuit for the ferric oxide, such as a flocculent polyelectrolyte polymer.

In order to better understand the purpose of this invention, the drawings represent a preferential way for its practical performance, subject to accessory changes that do not impair its basis.

FIG. 1 is a schematic representation of a practical performance of the system described in this invention.

The following is an example of non-limiting practical performance example of this invention.

A work tank (1), in which the work of the machine tool is carried out on the component, serves as a container for the water (a) used for this work which is contaminated by particles produced by the job, such as milling, roughing-down, eroding, polishing, etc.

The components to be worked on are usually iron (Fe) compounds in the majority of cases, such as steel, and therefore one of the main polluting agents of the water or dirty liquid that exits through the duct (2) towards the dirty liquid container (3) is iron.

After reaching the dirty liquid container (3), it is then passed through a filter (4) from which a clean liquid tank (5) and also the work tank (1) are supplied (all this is explained in a simplified way).

In many work processes it is convenient to carry out this process with water that has a conductivity ($\gamma$) lower than normal, for example $\gamma \leq 60\ \mu S/cm$, such as in the electroerosion processes.

In order to obtain this low conductivity, the applicant has a mixed bed ionic exchange resin tank (6) in closed circuit as regards the clean liquid tank (5), with very cationic and anionic resins in approximately the same proportion.

At times it is convenient to deionize the water until conductivity ($\gamma$) values close to a: $\gamma \cong 10\ \mu S/cm$, as for example in electroerosion processes using submerged wire. It can be seen in these processes with very low conductivity water that the introduction of the resin tank (6) in the filtering system achieves the objective of obtaining low conductivity but the liquid that is recycled from the work tank (1)→dirty liquid tank (3)→filter (4)→clean liquid tank (5) remains continuously contaminated by a new product that gives the liquid a reddish color and that has properties which are harmful for the work.

The applicant, on studying the problem, has reached the conclusion that the cause of the new contamination is the iron in a ferric state.

When working with water that does not have a very low conductivity ($\gamma$), for example $\gamma > 40\ \mu S/cm$, the residual concentrations of other ions of $Ca^{++}$, $Na^+$, $Mg^{++}$, etc., allow dissolution of the iron of the shavings coming from the part to be worked on, transforming it into a ferrous ion $Fe^{++}$, but prevent it from dissolving at saturation levels and, therefore, the water that goes through the filter (4) becomes completely transparent.

If the water used in the work process is, as has been stated previously, of a very low conductivity ($\gamma$) of: $\gamma \leq 30\ \mu S/cm$, it is seen that the iron dissolves up to saturation levels, passing from ferrous ion to ferric ion: $Fe^{++} \rightarrow Fe^{+++}$ which oxidizes and becomes ferric oxide: $Fe_2O_3$, that has a reddish color and that the filter (4) used is not even able to filter the system in general. However, it does settle the ferric oxide although this remains in the circuit In these circumstances, it seems that the $Fe_2O_3$ has colloid properties.

Once the cause of the polluting agent ($Fe_2O_3$) has been verified, a flocculent polyelectrolyte polymer (7) (or a mixture of them) is introduced into the circuit at the level of the dirty water outlet duct (2) towards the dirty water tank (3) which electrically unstabilizes the surface of the contaminating particles. This results in colloidal ferric oxide ($Fe_2O_3$) particles forming floccules which can be filtered and settled.

The polyelectrolyte can be an organic flocculent based on a granule or solution polyacrylamide, which causes the electrical unstabilization and the chaining of numerous individual particles resulting in floccules.

In a specific case, with conductivity water $\gamma = 12\ \mu S/cm$, a molecular mass polyacrylamide of nine million in a solution of 0.08% weight has been used with good results.

I claim:

1. In a liquid filtering system for machine tools having a recycling circuit employing water in a work tank, a dirty liquid tank, a filter and a clean liquid tank, the improvement comprising a flocculent tank connected to said recycling circuit and containing at least one ferric oxide flocculent wherein said water in said recycling circuit has a conductivity of less than or equal to $30\ \mu S/cm$.

2. The liquid filtering system of claim 1 wherein the ferric oxide flocculent is a polyelectrolyte polymer.

3. The liquid filtering system of claim 2 wherein the flocculent tank is connected to the dirty liquid tank.

4. The liquid filtering system of claim 1 further comprising a mixed bed ionic exchange resin tank connected in a closed circuit with the clean liquid tank.

5. The system of claim 1 wherein said water has a conductivity of $12\ \mu S/cm$.

6. A method for filtering, cooling and cleaning liquid used for machine tools comprising the steps of:

recycling said cooling and cleaning liquid in a recycling circuit which comprises a work tank, a dirty liquid tank, a filter and a clean liquid tank;

using water having a conductivity of less than or equal to 30 $\mu$S/cm as the cooling and cleaning liquid in said recycling circuit;

adding to said water at least one ferric oxide flocculent so as to flocculate ferric oxide contained in said water; and filtering said flocculated ferric oxide from said water with said filter.

7. The method of claim 6 further comprising the step of treating said water with a mixed bed ionic exchange resin.

8. The method of claim 6 wherein said water has a conductivity of 12 $\mu$S/cm.

9. The method of claim 6 wherein said ferric oxide flocculent is a polyelectrolyte polymer.

10. The method of claim 9 wherein said polyelectrolyte polymer is a polyacrylamide.

11. The method of claim 10 wherein said polyacrylamide has a molecular mass of nine million and is used in an amount of about 0.08% by weight.

\* \* \* \* \*